United States Patent Office 3,025,310
Patented Mar. 13, 1962

3,025,310
PROCESS FOR PREPARING 19-NORTESTOSTERONE DERIVATIVES SUBSTITUTED IN THE 4-POSITION AND PRODUCTS OF HIGH ANABOLIC ACTIVITY OBTAINED THEREBY
Bruno Camerino, Milan, Italy, assignor to Societá Farmaceutici Italia, a corporation of Italy
No Drawing. Filed Oct. 26, 1956, Ser. No. 618,442
Claims priority, application Italy May 21, 1956
4 Claims. (Cl. 260—397.4)

This invention relates to the preparation of 19-nortestosterone derivatives substituted in the 4-position.

The compounds of the present invention are defined by the following general formula:

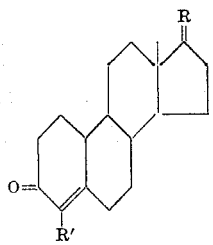

wherein R represents =O, (H)OH, (H)OR", (CH$_3$)OH and (C$_2$H$_5$)OH, R' represents F, Cl and OH, and R" represents an acyl group.

These new compounds were found to possess high anabolic activity on proteins and a relatively low androgen activity. Consequently, they are of great importance in human and veterinary medicine since they may be used in the treatment of decay, osteoporosis, emaciation, convalescence, premature newborns, underdevelopment and senility.

In the copending application of July 19, 1956, Serial No. 598,754, now abandoned, of which this application is a continuation-in-part, new steroid hormone derivatives substituted in the 4-position as well as the method of making them from 4,5-epoxy-3-keto-steroids have been disclosed. Now I found that, by treating 4,5-epoxy-19-nortestosterones of the general formulas

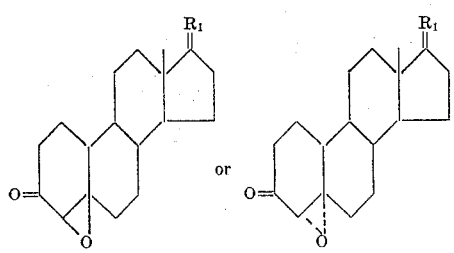

wherein R$_1$ represents =O, (H)OH, (CH$_3$)OH and (C$_2$H$_5$)OH, with mineral acids in an organic solvent at about room temperature, the herein-claimed 4-substituted 19-nortestosterone derivatives are obtained.

The following examples are presented to illustrate the present invention, but in no way to limit the scope of the appended claims.

EXAMPLE 1

4-Chloro-19-Nortestosterone Acetate

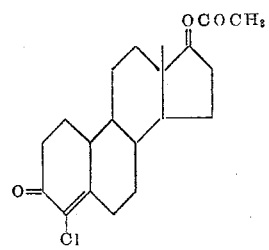

1.9 g. 19-nortestosterone are dissolved in 120 cc. methanol and treated for 1 hour with 3.8 cc. 4/N NaOH and 7 cc. 36% H$_2$O$_2$.

The solution is then acidified with 0.4 cc. acetic acid, diluted with water and extracted with ethyl acetate. The extract is washed with water, dried and distilled.

1.9 g. of a mixture of 4β,5-epoxy-19-nor-etiocholane-17β-ol-3-one and 4α,5-epoxy-19-nor-androstane-17β-ol-3-one obtained in this manner are acetylated with pyridine and acetic anhydride at room temperature for 16 hours. After pouring into ice water, filtering and drying, 1.95 g. of a mixture of epoxides acetates are obtained which are recrystallized from ether-petroleum ether and yield 1.42 g. 4β,5-epoxy-19-nor-etiocholane-17β-ol-3-one acetate, M.P. 110–112° C., [α]$_D$=+102° (in CHCl$_3$).

0.5 g. 4β,5-epoxy-19-nor-etiocholane-17β-ol-3-one acetate are dissolved in 20 cc. chloroform containing 2 cc. ethanol, and treated for 30 minutes with anhydrous HCl. After washing with water, drying and distilling, the residue is crystallized from methanol and 0.3 g. 4-chloro-19-nortestosterone acetate are obtained, M.P. 168–170° C., λmax 255 mμ, ε=13.980.

EXAMPLE 2

4-Chloro-19-Nortestosterone Cyclopentylpropionate

The process of Example 1 is repeated, except that the epoxide acetate is substituted by the cyclopentylpropionate.

The 4-chloro-19-nortestosterone cyclopentylpropionate having λmax 257 mμ and ε=12.800, is obtained.

EXAMPLE 3

*19-Nor-Δ⁴-Androstene-4,17β-Diol-3-One-17-Acetate*

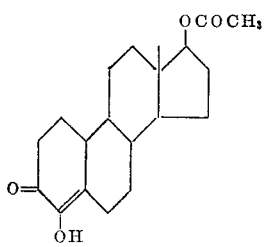

0.5 g. 4β,5-epoxy-19-nor-etiocholane-17β-ol-3-one acetate are dissolved in 2.5 cc. acetic acid and a 1 cc. solution of $H_2SO_4$ in acetic acid (ratio 1:4 by volume) and left standing overnight at room temperature. The solution is diluted with ice and extracted with benzene. The extract is washed with alkali and water, and is dried and distilled. The residue is taken up with methanol and yields 0.35 g. 19-nor-Δ⁴-androstene-4,17β-diol-3-one-17-acetate, M.P. 210–212° C., λmax 276 mμ, ε=12.670.

EXAMPLE 4

*4-Fluoro-19-Nortestosterone Acetate*

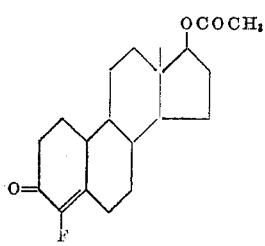

0.5 g. 4β,5-epoxy-19-nor-etiocholane-17β-ol-3-one-acetate are dissolved in 15 cc. chloroform and 1.5 cc. absolute ethanol and treated for 50 minutes with a stream of anhydrous HF. An amount of a 2 N NaOH solution, insufficient to neutralize the hydrofluoric acid, is then added, the resulting precipitate is separated, washed with water, dried and the solvent is distilled off.

Upon crystallization from ether-petroleum ether, 4-fluoro-19-nortestosterone acetate is obtained, λmax 241 mμ, ε=12.200.

EXAMPLE 5

*4-Chloro-17α-Methyl-19-Nortestosterone*

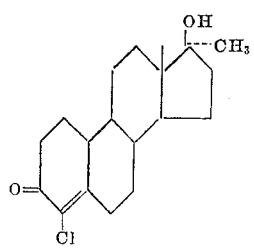

17α-methyl-19-nortestosterone is epoxidized by treating with alkaline hydrogen peroxide as described in Example 1. The crude epoxide thus obtained is dissolved in a chloroform-ethanol mixture and treated with anhydrous HCl as in Example 1. 4-chloro-17α-methyl-19-nortestosterone is obtained, λmax 256 mμ, ε=13.400.

EXAMPLE 6

*4-Chloro-17α-Ethyl-19-Nortestosterone*

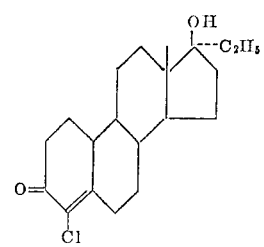

The process is carried out as in example 5, starting with 17α-ethyl-19-nortestosterone. 4-chloro-17α-ethyl-19-nortestosterone is obtained, λmax 256 mμ, ε=12.700.

EXAMPLE 7

*Pharmacological Activity of 4-Chloro-19-Nortestosterone-Cyclopentylpropionate*

4-chloro-19-nortestosterone cyclopentylpropionate, injected into impuberal rats, castrated according to the method of Hershberger et al. (Proc. Soc. Expt. Biol. and Med. 83, 175, (1953)), in doses of 250 γ, increases the weight of the "levator ani" muscle from 11.7 mg. to 32 mg., while 19-nortestosterone cyclopentylpropionate increases the weight of this muscle from 11.7 mg. to 40.1 mg.

4-chloro-19-nortestosterone cyclopentylpropionate increases the prostate weight from 8.8 to 21.4 mg. (19-nortestosterone cyclopentylpropionate from 8.8 to 44.1 mg.) and the weight of the seminal bladders from 5.6 to 19.7 mg. (19-nortestosterone cyclopentylpropionate from 5.6 to 42.2 mg.).

Consequently, the ratio between the anabolic activity and the androgen activity calculated according to Hershberger et al., is 1.61 for the 4-chloro-19-nortestosterone cyclopentylpropionate and 0.80 for the 19-nortestosterone cyclopentylpropionate.

I claim:
1. 19-nor-Δ⁴-androstene-4,17-beta-diol-3-one-17-acetate.
2. A process of making 19-nor-Δ⁴-androstene-4,17-beta-diol-3-one-17-acetate, comprising treating 4 beta, 5-epoxy-19-nor-etiocholane-17-beta-ol-3-one acetate, dissolved in acetic acid, with sulfuric acid at about room temperature.
3. A chemical compound having high anabolic activity on proteins and relatively low androgen activity, said compound being a 17-ester of 4-hydroxy-19-nortestosterone of the general formula

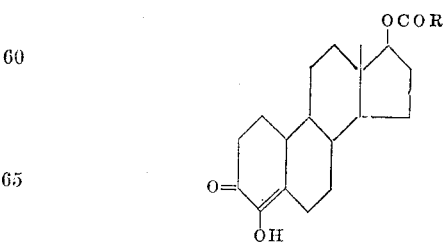

in which the —COR radical is an acyl radical derived from a non-toxic, stable, pharmaceutically acceptable acid, the acid having not more than eight carbon atoms, the R group being a saturated hydrocarbon radical.
4. A process of making a 17-ester of 4-hydroxy-19- nortestosterone of the formula defined in claim 15, comprising treating the corresponding 17-ester of 4,5-epoxy-19-norandrostane-17β-ol-3-one, dissolved in acetic acid, with sulfuric acid at about room temperature.

References Cited in the file of this patent

UNITED STATES PATENTS

| | | |
|---|---|---|
| 2,738,348 | Colton | Mar. 13, 1956 |
| 2,762,818 | Levy et al. | Sept. 11, 1956 |
| 2,842,571 | Camerino et al. | July 8, 1958 |
| 2,885,398 | Julian et al. | May 5, 1959 |
| 2,908,682 | Bible et al. | Oct. 13, 1959 |

OTHER REFERENCES

Camerino et al.: J.A.C.S., vol. 78, pp. 3540–41, July 20, 1956.